United States Patent [19]
Ueda et al.

[11] Patent Number: 5,992,857
[45] Date of Patent: *Nov. 30, 1999

[54] COMPOSITE GASKET

[75] Inventors: Takahisa Ueda; Masahiko Takaoka; Takeshi Miyoshi; Shingo Hoshikawa, all of Sanda, Japan

[73] Assignee: Nippon Pillar Packing Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,462

[22] Filed: Mar. 21, 1997

Related U.S. Application Data

[63] Continuation of application No. 08/392,747, filed as application No. PCT/JP94/00869, May 30, 1994, abandoned.

[30] Foreign Application Priority Data

Aug. 31, 1993 [JP] Japan ................................. 5-215915

[51] Int. Cl.$^6$ ..................................................... F16J 15/10
[52] U.S. Cl. ........................ 277/592; 277/627; 277/650; 277/938; 277/946
[58] Field of Search ..................................... 277/592, 605, 277/608, 627, 650, 651, 654, 936, 938, 946; 428/155, 136, 137, 167, 48, 49, 173; 285/910, 925

[56] References Cited

U.S. PATENT DOCUMENTS

| | | | |
|---|---|---|---|
| 494,402 | 3/1893 | Walsh | 285/910 |
| 981,524 | 1/1911 | Bonner | 285/910 |
| 2,127,372 | 8/1938 | Victor et al. | 277/227 |
| 2,269,486 | 1/1942 | Santoro | 285/910 |
| 2,477,267 | 7/1949 | Robinson | 277/901 |
| 3,841,958 | 10/1974 | Delorme . | |
| 3,878,100 | 4/1975 | Bixler | 428/155 |
| 4,156,529 | 5/1979 | Hafele | 277/901 |
| 4,223,897 | 9/1980 | Staab et al. | 277/DIG. 6 |
| 4,288,081 | 9/1981 | Sado | 277/901 |
| 4,373,735 | 2/1983 | Morsbach et al. | 277/DIG. 6 |
| 4,691,928 | 9/1987 | Abele | 277/901 |
| 4,758,003 | 7/1988 | Goldstein et al. | 277/DIG. 6 |
| 4,861,786 | 8/1989 | Brown | 428/349 |
| 4,919,969 | 4/1990 | Walker | 277/901 |
| 5,004,249 | 4/1991 | Grosch et al. | 277/227 |
| 5,443,887 | 8/1995 | Nakao | 277/DIG. 6 |
| 5,628,520 | 5/1997 | Ueda et al. . | |

FOREIGN PATENT DOCUMENTS

| | | | |
|---|---|---|---|
| 2756351 | 5/1979 | Germany | 285/910 |
| 55-76257 | 9/1980 | Japan . | |
| 57-57773 | 4/1982 | Japan . | |
| 2057764 | 2/1990 | Japan | 277/DIG. 6 |
| 2-40350 | 10/1990 | Japan . | |
| 3-505596 | 12/1991 | Japan . | |
| 109137 | 4/1994 | Japan | 277/233 |
| 18875 | 5/1902 | Switzerland | 277/227 |

*Primary Examiner*—Anthony Knight
*Assistant Examiner*—John L. Beres
*Attorney, Agent, or Firm*—Jones, Tullar & Cooper, P.C.

[57] ABSTRACT

The composite gasket of the present invention has improved various properties which are different depending on use conditions, while ensuring sealing properties, by combining a seal material which is selected in accordance with the properties of certain sheet-like seal materials in a substrate. The composite gasket is configured by forming a plurality of slits in a surface of the sheet-like seal materials the slits extending in a thickness direction of the materials, and loading a seal material composed of a substance which is different from a material constituting the sheet-like seal material into the slits and the surface of the seal material.

8 Claims, 12 Drawing Sheets

Fig.11

| | Embodiment 1 | Embodiment 2 | Embodiment 3 | Embodiment 4 | Embodiment 5 |
|---|---|---|---|---|---|
| Sheet-like seal material | expanded graphite sheet | expanded graphite sheet | joint sheet | porous PTFE sheet | expanded graphite sheet |
| Reinforcing material | SUS 316L thickness: 0.05mm | SUS 316L thickness:0.05mm | SUS 304 thickness:0.05mm | ---------- | SUS 316 thickness:0.05mm |
| Seal material to be composed | silicone rubber | fluoro rubber | PTFE + inorganic powder | fluoro rubber | silicone rubber |
| Adhesive agent | phenol type | phenol type | phenol type | ---------- | phenol type |
| Slit interval | 3 mm | 3 mm | 3 mm | 3 mm | 3 mm |
| Slit shape | lattice | lattice | lattice | lattice | lattice |
| Others | | | | | pressure molding after filling seal material |

| Seal substrate | Expanded graphite sheet | PTFE sheet | Joint sheet | Beater sheet |
|---|---|---|---|---|
| Leakage along contact surfaces due to reduced surface draping properties | | | Exist | Exist |
| Penetration leakage from internal layers | Exist | Exist | Exist | |
| Bonding to flange surface | Exist | | Exist | Exist |
| Corrosion by foreign substance included in seal material | Exist | | Exist | Exist |
| Small coefficient of surface friction and occurrence of creep due to reduced heat resistance | Exist | Exist | | |

5,992,857

COMPOSITE GASKET

This is a continuation of application Ser. No. 08/392,747 filed on Mar. 8, 1995, now abandoned, which is a 371 of PCT/JP94/00869 filed May 30, 1994.

TECHNICAL FIELD

The present invention relates to a gasket which is useful for sealing a flange connection portion of a pipe joint, a passage connection portion of a fluid apparatus, or the like, and more particularly to a sheet-like composite gasket which is cut out in an arbitrary shape from a large sheet base material, and then used.

BACKGROUND ART

Conventionally, such gaskets used in practice include many types such as a gasket configured by a single body of a sheet-like seal material composed of expanded graphite, or the like, and a gasket in which a sheet-like seal material and a reinforcing material such as metal foil are stacked to be formed into one piece in order to ensure strength.

For example, FIG. 16 shows a gasket 100 which is composed by interposing and fixing a sheet-like reinforcing material 103 in a sandwich-like manner between two sheet-like seal materials 101A, 101B in a thickness direction with adhesive agents 102A, 102B. FIG. 17 shows a gasket 100 which is composed by interposing and fixing a reinforcing plate 104 wherein raised pieces 104a are partially formed, between the sheet-like seal materials 101A, 101B in the thickness direction.

In the above-mentioned prior art gaskets, the properties of the sheet-like seal materials 101A, 101B directly affect the required gasket properties. In a gasket using the sheet-like seal materials 101A, 101B composed of an expanded graphite sheet, for example, there arises no problem in leakage along the contact surfaces a due to reduced surface draping properties for a flange face, etc. as shown in FIGS. 18 and 19, but the existence of internal gaps 105 in layers 101A, 101B causes penetration leakage of a sealing fluid Q to easily occur. In place of an expanded graphite sheet, a porous polytetrafluoroethylene (PTFE) sheet, a joint sheet, or a beater sheet may be used as the sheet-like seal materials 101A, 101B. Also in all cases where such materials are used, however, there arise problems due to the defects shown in FIG. 19. In the case of a calcined sheet made of PTFE, there is a problem in leakage along the contact surfaces and creep due to reduced surface draping properties.

SUMMARY OF THE INVENTION

It is an object of the present invention to provide a composite gasket in which a sheet-like seal material is combined with a specific seal material in accordance with the use and the installation location, whereby leakage along the contact surfaces, and penetration leakage from internal layers can be eliminated to improve the sealing of the gaskets properties.

It is another object of the present invention to provide a composite gasket which can improve various required properties which differ according to the use and the installation location.

In order to attain the noted objects, the composite gasket of the present invention is a composite gasket comprising a gasket substrate including a sheet-like seal material in which a plurality of slits are formed in the sheet-like seal material, the slits being elongations extending from the surface of the sheet-like seal material in the thickness direction, and a seal material composed of a substance which is different from the sheet-like seal material is loaded and/or stacked into the slits and/or the surface of the sheet-like seal material. The loading includes the filing and the stacking. Either the filing or the stacking may be conducted only. Alternatively, both the filing and the stacking may be conducted in parallel.

As the sheet-like gasket substrate of the composite gasket having the above-mentioned configuration, a sheet-like seal material may be used singly, or a stack in which a sheet-like seal material is disposed on both faces, or one face (i.e., at least one of the faces), of a reinforcing material may be used. The reinforcing material includes stainless steel (SUS); metal foil or a thin plate of copper, aluminum, titanium, iron (SPCC), or the like; foil or plate in which many holes are formed; a plastic film; a net (mesh); and the like.

Preferably, the slits of the composite gasket having the above-mentioned configuration have a depth which is within a range of 10 to 100% of the thickness of the sheet-like seal material in the gasket substrate, and are continuously formed in such a manner that the surface of the gasket substrate is divided in a,predetermined shape.

As the sheet-like seal material in the gasket substrate, a sheet selected from an expanded graphite sheet, a PTFE sheet, a joint sheet, and a beater sheet is useful. In the present invention, unless otherwise specified, a PTFE sheet means both a calcined PTFE sheet which was calcined and has a density greater than 1.8 g/cm$^3$, and a porous PTFE sheet which is not calcined and has a density of 0.2 to 1.8 g/cm$^3$. As the joint sheet, useful are inorganic fiber or organic fiber such as glass fiber, aramid fiber, carbon fiber, or rock wool; and a combination of a binder such as synthetic rubber (for example, nitrile butadiene rubber: NBR), chloroprene rubber (CR), natural rubber (NR), silicone rubber, acrylic rubber, or PTFE, and a filler which is inorganic powder such as talc, sepiolite, chlorite, wallastonite, kaolin, clay, mica, or potassium titanate.

As the seal material to be combined, a substance selected from substances which are different from the substance constituting the sheet-like seal material in the gasket substrate would be useful. Included among these substances are: impermeable substances which have no internal voids, such as rubber, resin, and grease; soft seal materials such as soft rubber, and soft resin; nonadhesive substances such as graphite, and mica; substances which are excellent in corrosion prevention, such as a sacrificial metal, and adsorption anticorrosives; creep resistant substances which are obtained by filling organic fiber, inorganic fiber, or the like in rubber or resin.

The seal material to be combined is adequately selected from those described in detail below, in accordance with required properties which are to be improved depending on the use and the installation location of a gasket.

(1-1) In the case where penetration leakage from internal layers and leakage along contact surfaces is required to be prevented from occurring:

Impermeable materials which have no internal voids, specifically, rubber such as NBR, CR, silicon acrylic, and NR; resin such as epoxy, phenol, nylon, polyethylene, PTFE, and acrylic ester; high viscous oil such as silicone oil, and fluorooil; and grease such as paraffin wax, bees wax, and Japan wax.

(1-2) In the case where improved surface draping properties are required:

The same materials as those in (1-1) above, for example, soft epoxy resin, and a soft seal material such as soft rubber having a small rubber hardness.

(1-3) In the case where a gasket is required not to bond to a flange:

Nonadhesive substances such as graphite (scale-like graphite, earthy graphite and the like excluding expanded graphite), layer minerals such as mica, PTFE resins including porous PTFE, silicon, and polyethylene; wax; silicone oil; and fluorooil.

(1-4) In the case where flanges are required not to be corroded:

Grease such as petrolatum, and wax; adsorption anticorrosives such as mineral oil of the amine type or the like; and passivating agents such as nitrite. In the case where flanges are required not to be electrolytically-corroded: fine powder of a sacrificial metal such as zinc, and aluminum.

(1-5) In the case where the surface friction force is required to be increased, scratch prevention (protection) of a surface is required, and creep protection is required:

Materials in which inorganic short fiber such as carbonfiber, glass fiber, ceramic fiber, and rock wool, or organic fiber chops such as aramid fiber, phenol fiber; and inorganic powder such as talc, sepiolite, chlorite, wollastonite, kaolin, clay, mica, potassium titanate, and particularly fiber-, needle-, or flake-like one of these materials are combined as a filler with the rubber and resin materials listed in (1-1) and (1-2) above.

According to the present invention, a plurality of slits are formed in a surface of a sheet-like seal material in a gasket substrate, the slits elongating from the surface in the thickness direction, and a seal material composed of a substance which is different from the sheet-like seal material is loaded and/or stacked into the slits and/or the surface of the sheet-like seal material. Therefore, a large sheet base material may be produced, the sheet base material may be cut along slit lines in an arbitrary shape or size, and the cut out material may be used. When the seal material to be combined is adequately selected and used in accordance with the sheet-like seal material from substances which are different from the materials constituting the sheet-like seal material, moreover, the sheet-like seal material composed of the seal material which lacks, for example, stretchability is provided with stretchability so that lamination separation is prevented from occurring in the case where a bending force is applied, and operability is improved. Furthermore, various problems in practical use of a gasket material including the sheet-like seal material can be solved, and various required properties which differ according to the use and the installation location of the gasket can be improved.

When the sheet-like seal material in the gasket substrate is configured by a joint sheet or a beater sheet which has a large coefficient of friction and is excellent in heat resistance and creep resistance, for example, a soft seal material such as described above may be selected and used as the seal material to be combined, such as that to be filled into the slits. This can improve surface draping properties which constitute one of the problems of a sheet-like seal material, so that leakage along contact surfaces is suppressed and sealing properties as a gasket are improved.

When the sheet-like seal material in the gasket substrate is configured by an expanded graphite sheet or a porous PTFE sheet which has excellent surface draping properties and is free from leakage along contact surfaces, furthermore, an impermeable material such as described above may be selected and used as the seal material to be combined. This can prevent penetration leakage from internal layers which constitutes a problem of such a sheet-like seal material, from occurring, and cooperate with surface draping properties of the expanded graphite sheet or the porous PTFE sheet so as to greatly improve the sealing properties.

When a gasket used as a seal material for a flange connection portion of a pipe joint is configured by a joint sheet or a beater sheet having problems in that flange surfaces are liable to be corroded by a foreign substance such as sulfur or chlorine ions in the sheetlike seal material in the gasket substrate, and that such a sheet easily adheres to the flange surfaces, an anticorrosive substance or nonadhesive substance such as described above may be selected and used as the seal material to be combined. This can prevent the flange surfaces from being corroded by a foreign substance such as sulfur or chlorine ions in the seal material, whereby time-varying reduction in sealing properties can be suppressed and inconveniences due to bonding to a flange face can be prevented from arising. In this case, particularly when the whole of the surface of the sheet-like seal material is covered by a coating layer, the corrosion of a flange surface which may be caused by directly contacting sulfur, chlorine ions, etc. with the flange surface can effectively be prevented from occurring.

When the sheet-like seal material in the gasket substrate is configured by a PTFE sheet which has a small coefficient of surface friction and which is inferior in creep resistance because of impaired heat resistance, a creep resistant substance such as described above may be selected and used as the seal material to be combined. This increases the coefficient of friction and improves heat resistance, whereby the creeping phenomenon can be prevented from occurring.

As described above, when a seal material suitable for solving various problems which may arise in materials constituting the sheet-like seal material in the gasket substrate is selected and used in accordance with the constituting materials, it is possible to obtain a composite gasket which can satisfy substantially all of the properties required in a gasket of this kind, irrespective of the materials constituting the sheet-like seal material. In this case, since the amount of the seal material to be combined may be very small, the reduction in properties which the materials constituting the sheet-like seal material intrinsically have are very small in degree.

When the depth of the slits formed in the sheet-like seal material in the gasket substrate is selected so as to be within the range of 10 to 100% of the thickness of the seal material, the seal material to be combined can firmly be integrated with the gasket substrate by the anchor effect, and the effects of improving various properties can easily be attained in a satisfactory manner. When the depth of the slits is less than 10% of the thickness of the seal material, the seal material to be combined cannot sufficiently be integrated with the gasket substrate, and the seal material to be combined may be peeled off so that the predetermined effects of improving properties cannot be attained.

BRIEF DESCRIPTION OF THE DRAWINGS

FIG. 11 is a table showing constituting conditions of main portions of the composite gaskets of the first to fifth embodiments.

FIG. 19 is a table showing problems of seal materials in prior art gaskets.

DETAILED DESCRIPTION OF THE VARIOUS EMBODIMENTS

Hereinafter, embodiments of the present invention will be described with reference to the drawings.

Figure 1:
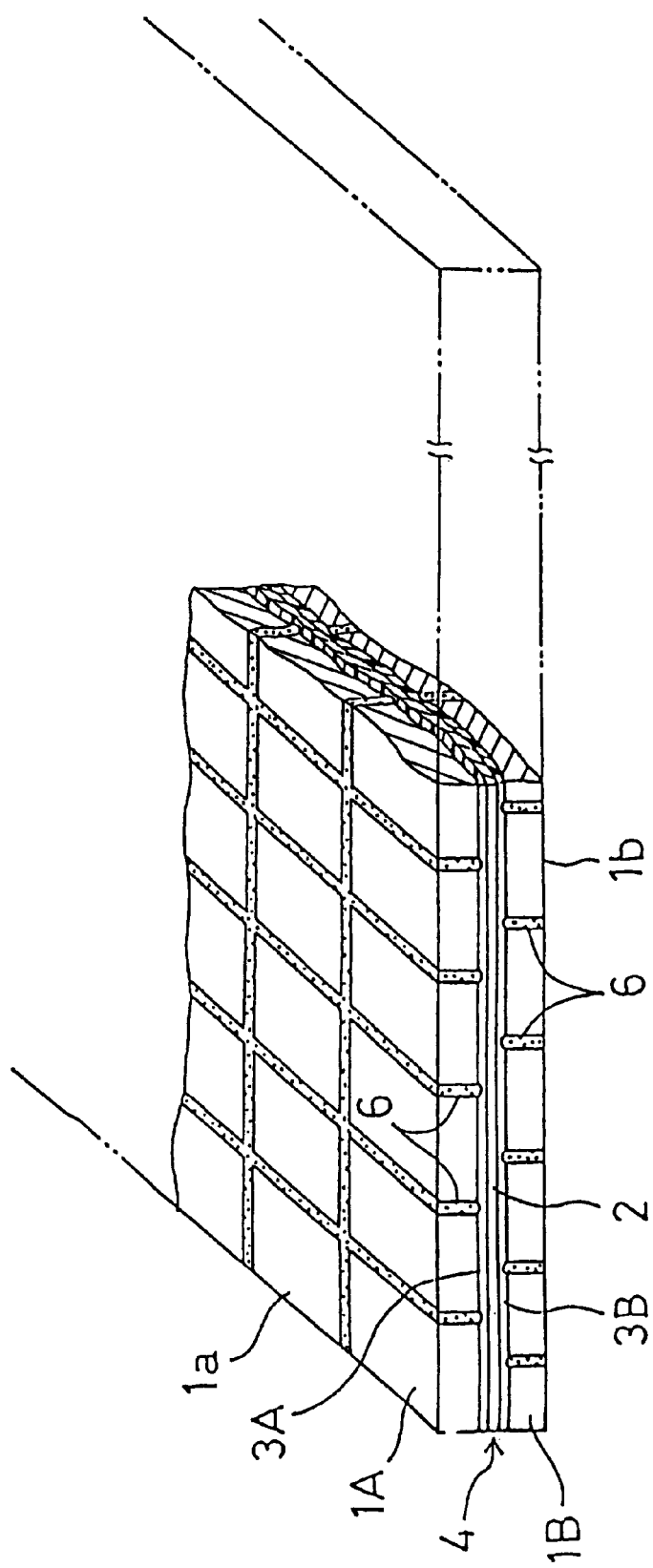
FIG. 1 is a partial cutaway perspective view showing a composite gasket according to a first embodiment of the present invention.

FIG. 1 is a partial cutaway perspective view showing a composite gasket according to a first embodiment of the present invention. In FIG. 1, 1A and 1B designate a pair of sheet-like seal materials which are stacked in the thickness direction. Each of the sheet-like seal materials 1A, 1B consists of an expanded graphite sheet (see FIG. 11). A reinforcing material 2 is interposed in a sandwich-like manner between the seal materials 1A, 1B. The reinforcing material 2 is composed of, for example, SUS 304 or SUS 316L having a thickness of about 0.05 mm, and bonded to the seal materials 1A, 1B by respective thermoplastic or thermosetting adhesive agents 3A, 3B. The seal materials 1A, 1B, the reinforcing material 2, etc. constitute a sheet-like gasket substrate 4.

Figure 2:
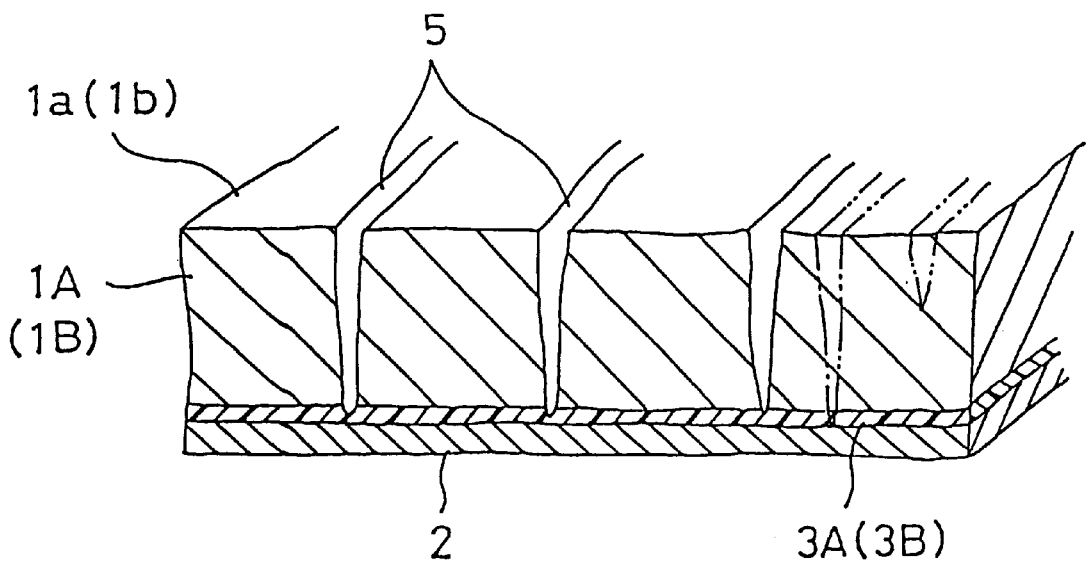
FIG. 2 is a cutaway perspective view in the case where slits are formed in the composite gasket of the first embodiment.

As shown in FIG. 2, a plurality of slits 5 are formed in the surfaces 1a, 1b of the seal materials 1A, 1B, which start from the respective surfaces 1a, 1b and elongate in the thickness direction. The depth of the slits is set to be within the range of 10 to 100% of the thickness of the seal materials 1A, 1B. When the slits are to be deeply formed, for example, the depth is set to an extent that the slits may reach the adhesive agent layers 3A, 3B, respectively. The slits 5 are continuously formed in such a manner that the surfaces 1a, 1b of the pair of seal materials 1A, 1B are divided in a predetermined shape, for example, a lattice-like shape.

Figure 3:
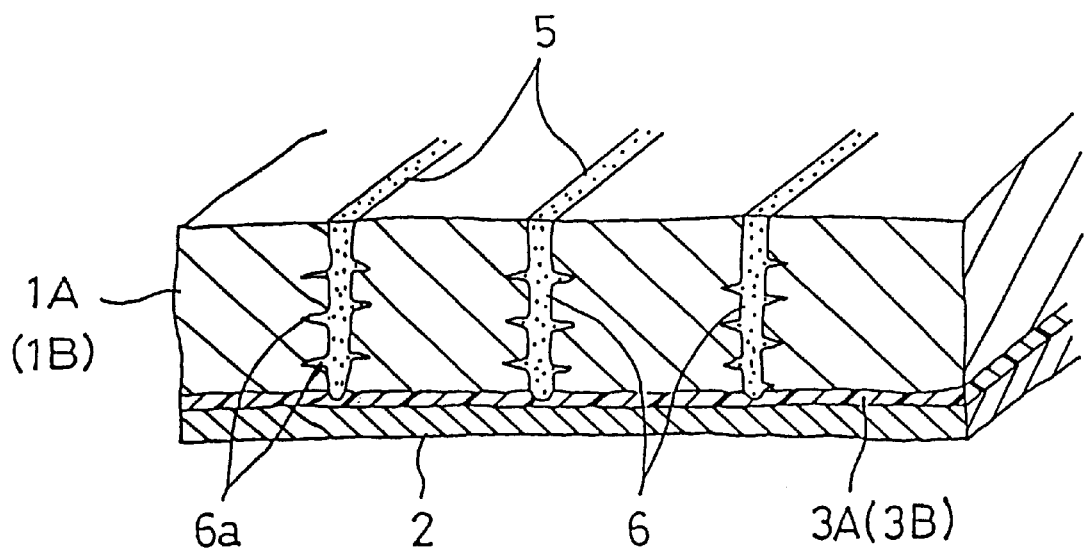
FIG. 3 is a cutaway perspective view showing in an enlarged manner a part of the composite gasket of the first embodiment.

A seal material 6 which is composed of an impermeable material such as silicone rubber that is a substance different from the seal materials 1A, 1B is filled into the slits 5 as shown in FIG. 3.

After the slits 5 are formed in the seal materials 1A, 1B made of an expanded graphite sheet, the seal material 6 comprising silicone rubber is filled into the slits 5, and then local filling portions 6a of the seal material 6 are formed in the inner walls of the slits 5 as shown in FIG. 3, thereby exhibiting an anchor effect. This causes the seal material 6 to be firmly integrated with the seal materials 1A, 1B.

According to the thus configured composite gasket, the filling of the seal material 6 into the slits 5 provides stretchability to the seal materials 1A, 1B, which are intrinsically inferior in stretchability, so that lamination separation, which may occur in the cases such as that where a bending force is applied, is suppressed. Furthermore, the gasket becomes easy to handle.

Figure 4:
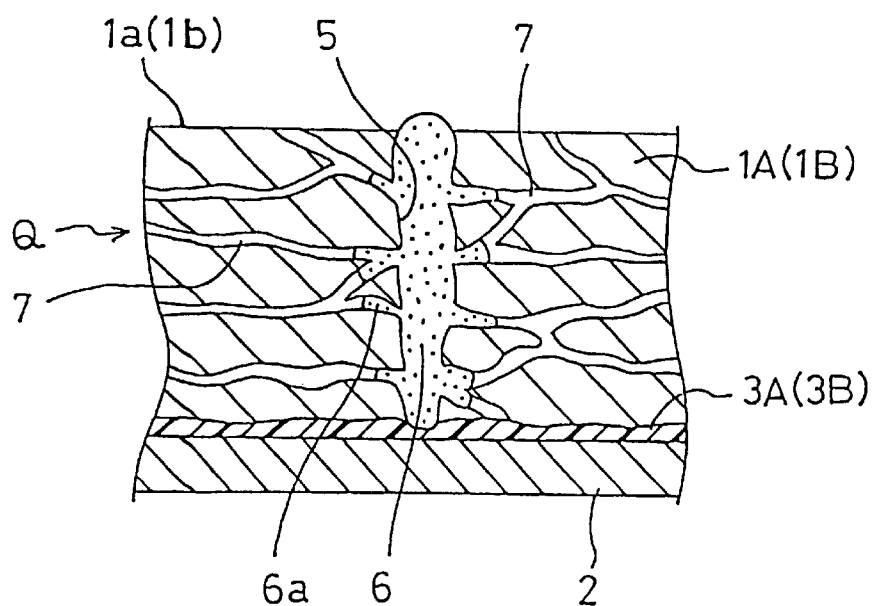
FIG. 4 is an enlarged section view illustrating the function the main portion of the composite gasket of the first embodiment.

Particularly, even when lamination gaps 7 such as shown in FIG. 4 are formed in the seal materials 1A, 1B, the silicone rubber 6 in the slits 5 functions as a seal material for penetration prevention to block the gaps 7. Consequently, penetration leakage of a sealing fluid Q is prevented from occurring. This cooperates with the intrinsic small leakage along the contact surfaces which results from using the expanded graphite sheet, to greatly improve the sealing properties of the overall gasket.

A material which can improve other properties may suitably be mixed into the seal material 6.

Figure 5:
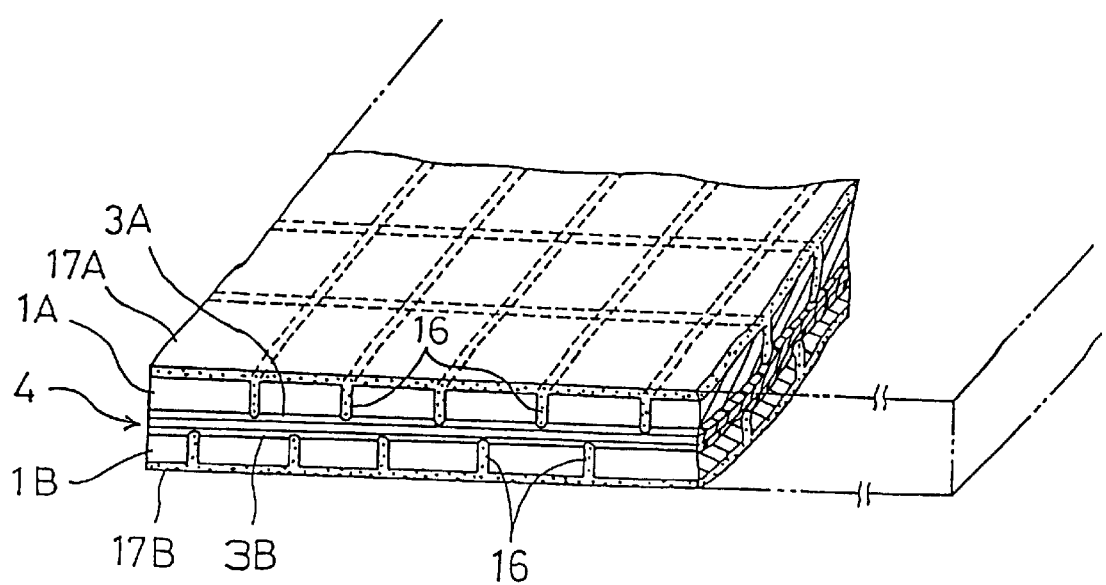
FIG. 5 is a partial cutaway perspective view showing a composite gasket according to a second embodiment of the present invention.
Figure 6:
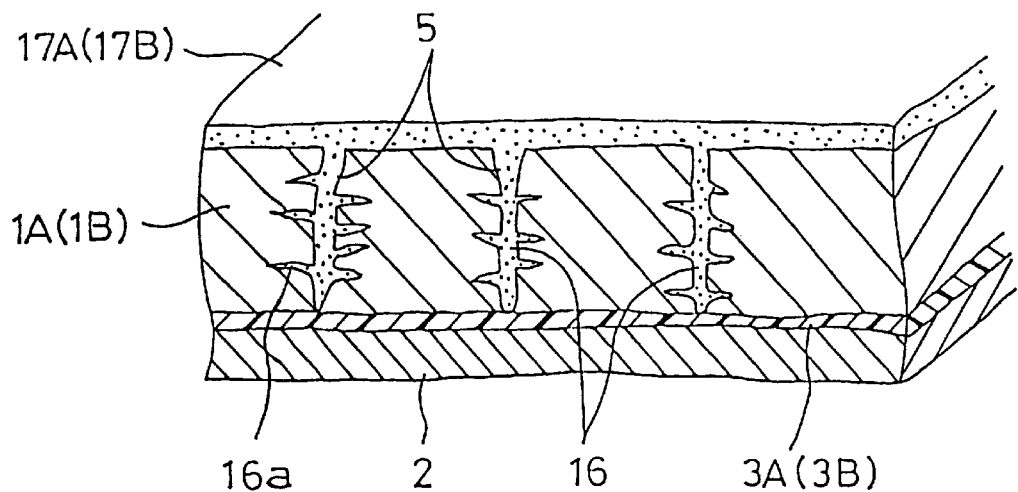
FIG. 6 is a cutaway perspective view showing in an enlarged manner a part of the composite gasket of the second embodiment.

FIG. 5 is a partial cutaway perspective view showing a sheet-like composite gasket which represents a second embodiment of the present invention. In the embodiment, fluoro rubber is used as a seal material 16 which is filled into the slits 5, and also the surfaces of the seal materials 1A, 1B are covered in a ply manner by seal materials 17A, 17B composed of a similar fluoro rubber, respectively. The other main portion is configured as shown in FIG. 11.

Also in the composite gasket shown in the second embodiment, in the same manner as the first embodiment, the seal material 16 in the slits 5 is firmly integrated with the seal materials 1A, 1B by the anchor effect exerted by local filling portions 16a of the seal material, and penetration leakage from internal layers can be suppressed. Moreover, the whole area of the surfaces is covered by the seal materials 17A, 17B. When the gasket is used as a seal material for a flange connection portion of a pipe joint, therefore, there is less fear that the gasket will bond to the flange surfaces, and sulfur or the like is prevented from directly contacting the flange surfaces so the corrosion of the flange surfaces can effectively be prevented from occurring.

Figure 7:
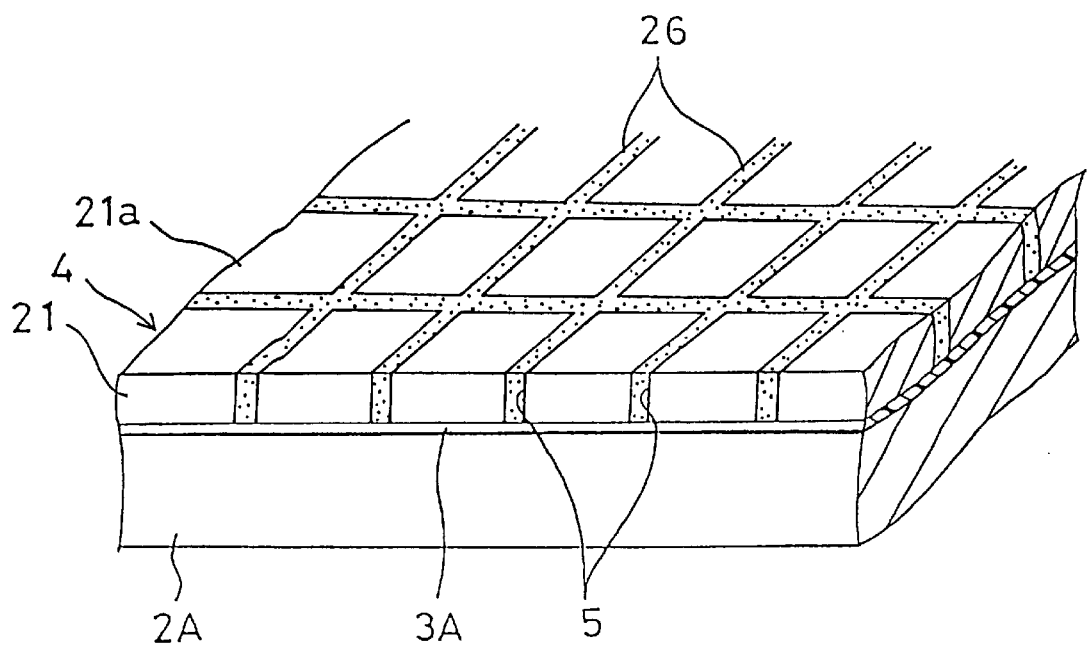
FIG. 7 is a partial cutaway perspective view showing a composite gasket according to a third embodiment of the present invention.

FIG. 7 is a partial cutaway perspective view showing a sheet-like composite gasket which represents a third embodiment of the present invention. In the embodiment, a joint sheet is used as a seal material 21, and a reinforcing material 2A composed of SUS 304 is fixed to one face of the seal material through a phenol adhesive agent 3A, thereby constituting the sheet-like gasket substrate 4. A seal material 26 which is obtained by mixing inorganic powder into PTFE and which has excellent creep resistance is filled into the slits 5 which are formed, starting from the surface 21a of the seal material 21 and elongating in the thickness direction. The other main portion is configured as shown in FIG. 11.

In the composite gasket shown in the third embodiment, the use of a joint sheet as the seal material 21 enables the creep properties to be maintained, and the seal material 26 in the slits 5 can improve leakage along the contact surfaces, and penetration leakage.

Figure 8:
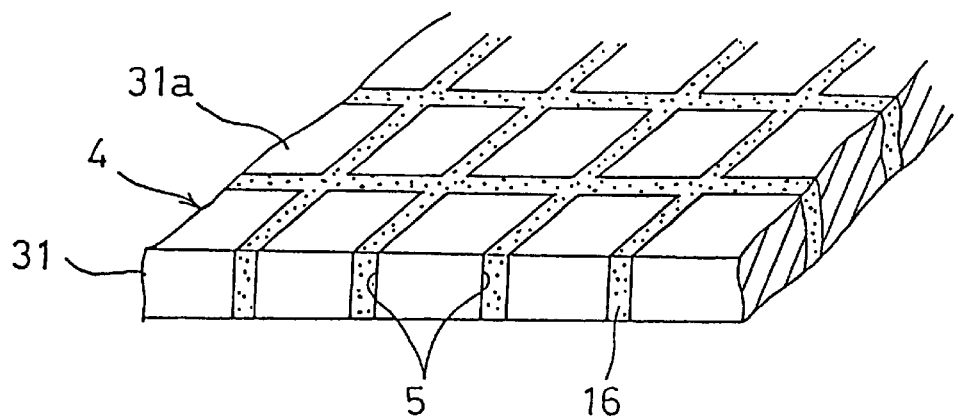
FIG. 8 is a partial cutaway perspective view showing a composite gasket according to a fourth embodiment of the present invention.

FIG. 8 is a partial cutaway perspective view showing a sheet-like composite gasket which represents as a fourth embodiment of the present invention. In the fourth embodiment, a porous PTFE sheet is used as a seal material 31, and the seal material 31 singly constitutes the gasket substrate 4. The slits 5 which pass through the seal material 31 in the thickness direction are formed in a lattice-like shape in the surface 31a of the seal material 31. A seal material 16 composed of fluoro rubber is filled into the slits 5. The other main portion is configured as shown in FIG. 11.

Also in the composite gasket shown in the fourth embodiment, the seal material 31 composed of the porous PTFE sheet prevents the gasket from bonding to a flange surface, and the flange surface from being corroded, and the seal material 16 effectively prevents the occurrence of penetration leakage from internal layers.

Figure 9:
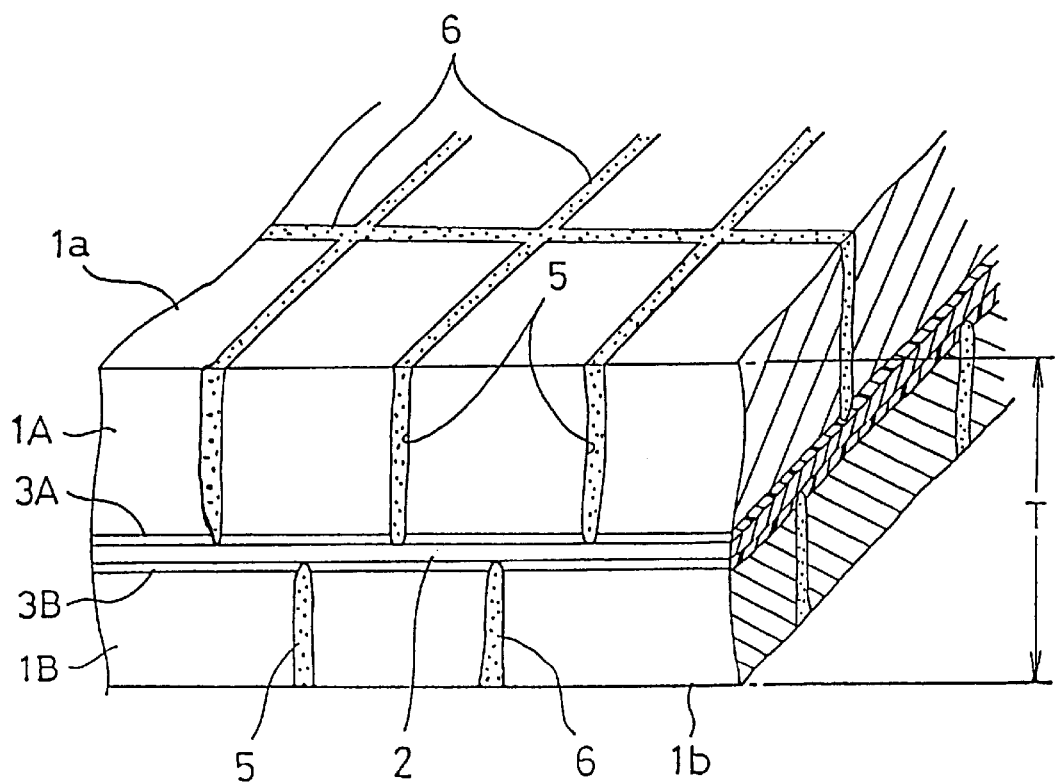
FIG. 9 is a partial cutaway perspective view showing a composite gasket according to a fifth embodiment of the present invention which is in a state before pressurization.
Figure 10:
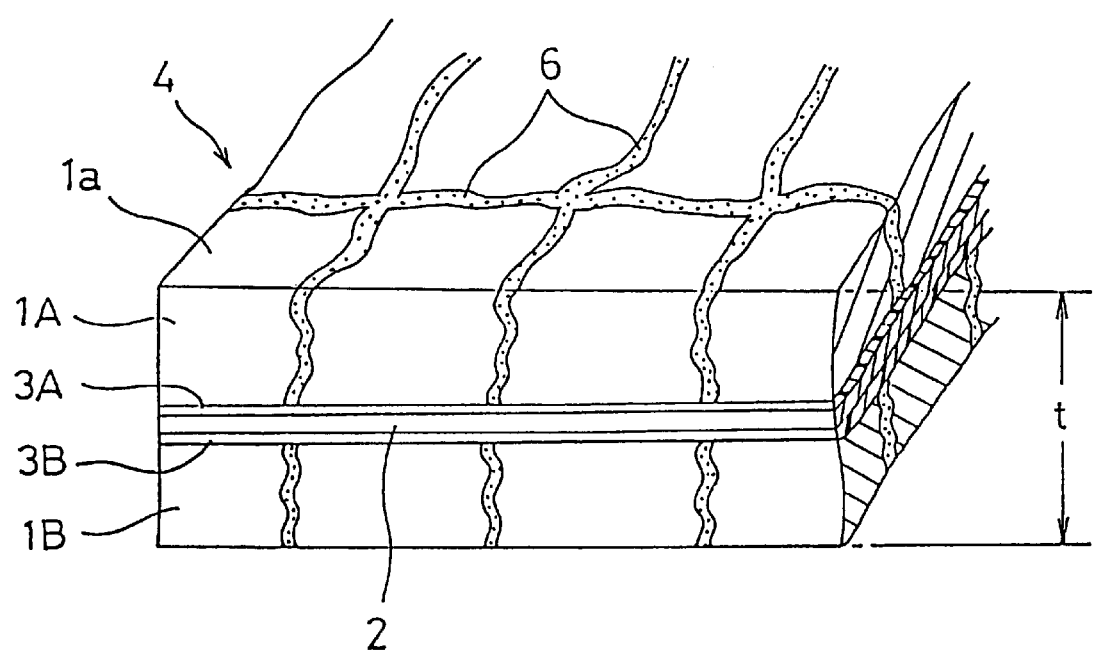
FIG. 10 is a partial cutaway perspective view showing the composite gasket according to the fifth embodiment which is in a state before pressurization.
Figure 12:
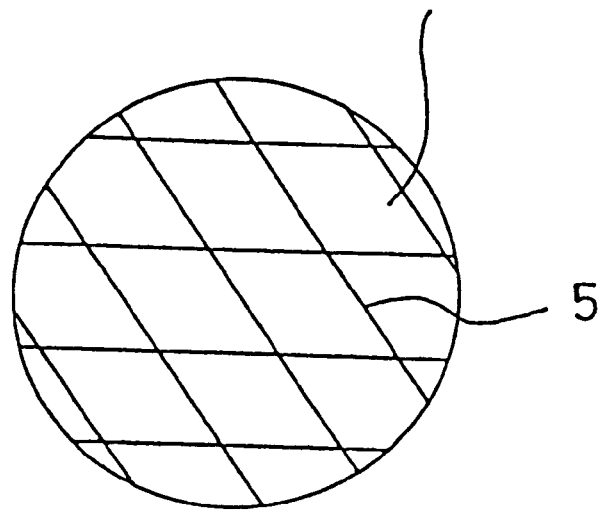
FIG. 12 is a plan view showing another shape of the slits.
Figure 13:
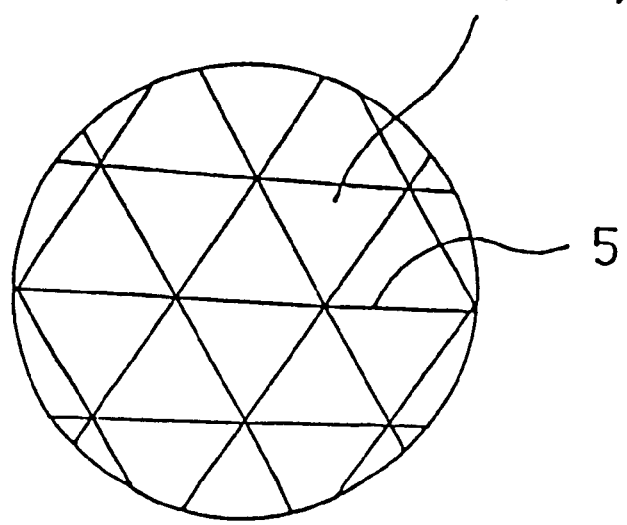
FIG. 13 is a plan view showing a further shape of the slits.
Figure 14:
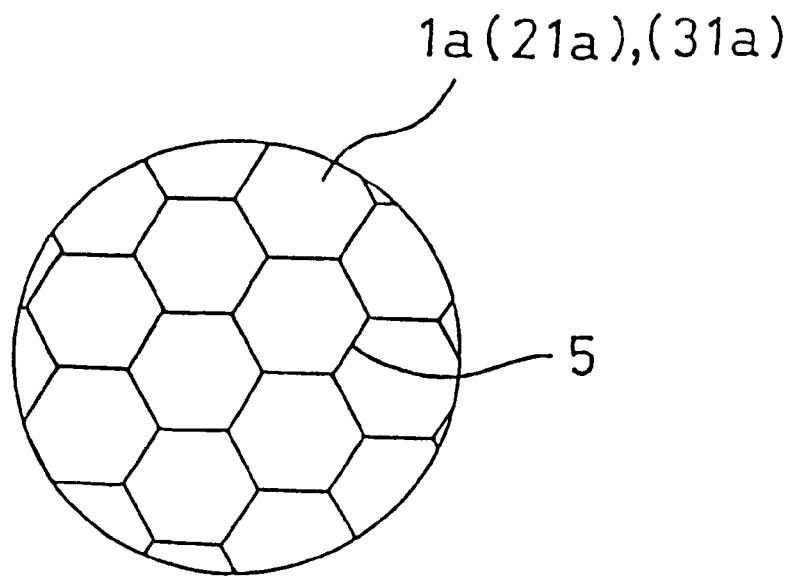
FIG. 14 is a plan view showing a still further shape of the slits.
Figure 15:
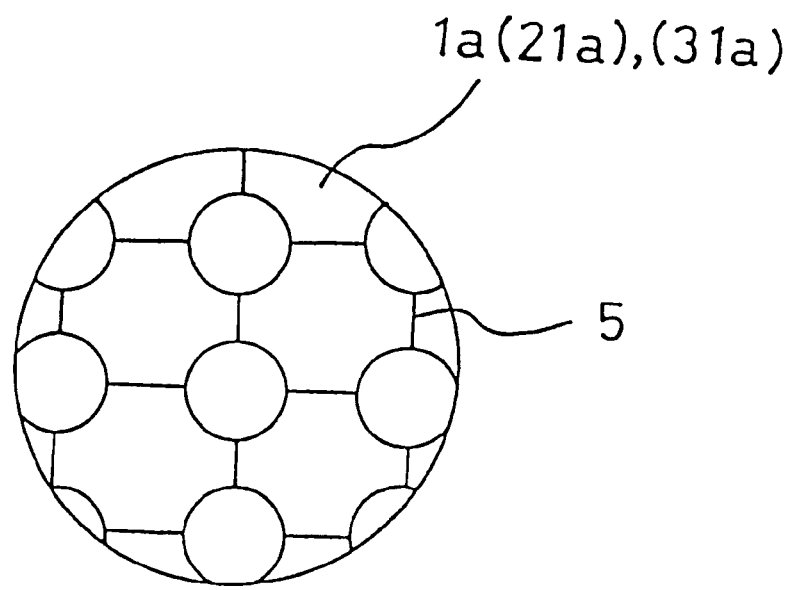
FIG. 15 is a plan view showing a still further shape of the slits.
Figure 16:
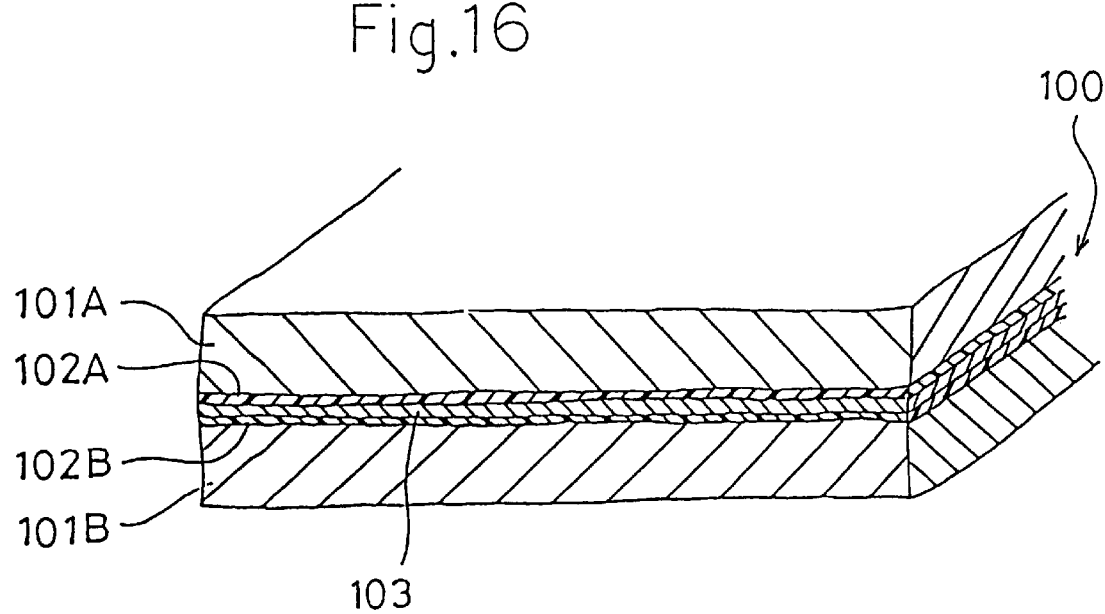
FIG. 16 is a partial cutaway perspective view showing a prior art gasket.
Figure 17:
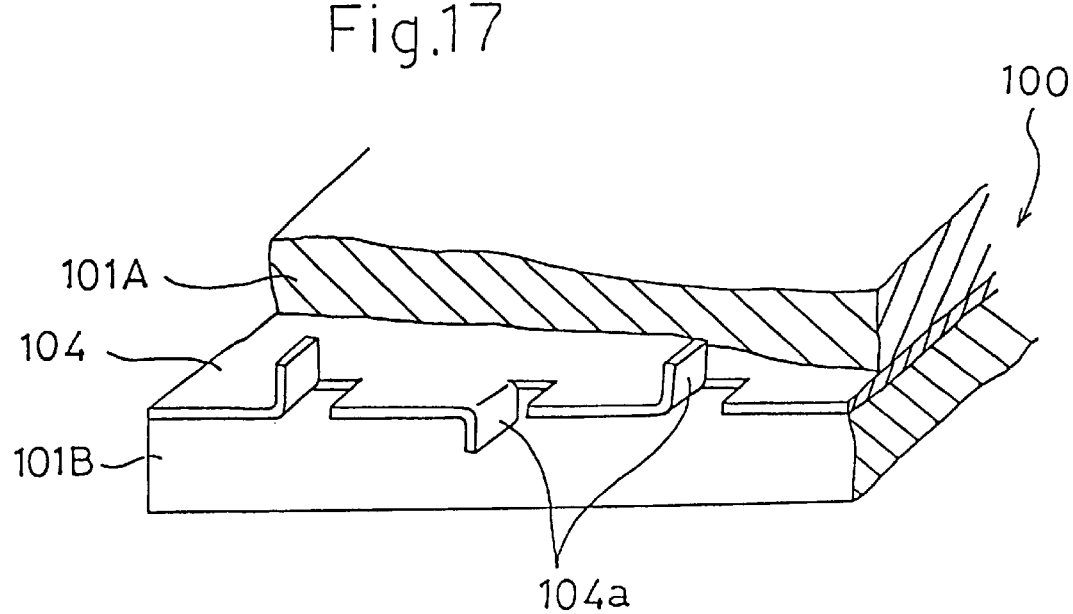
FIG. 17 is a partial cutaway perspective view showing another prior art gasket.
Figure 18:
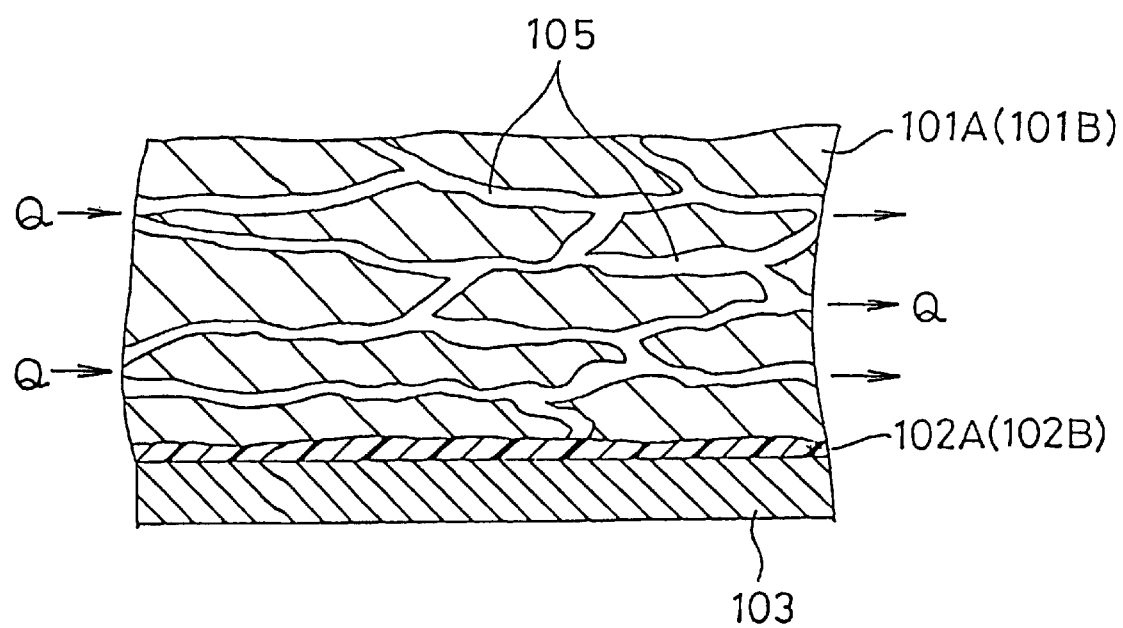
FIG. 18 is an enlarged section view of the main portion of a prior art gasket and showing a state of occurrence of penetration leakage in a prior art gasket.

FIGS. 9 and 10 are partial cutaway perspective views showing a sheet-like gasket which represents a fifth embodiment of the present invention. In the fifth embodiment, the gasket substrate 4 is configured in the same manner as that of the first embodiment. After the seal material 6 composed of silicone rubber is filled into the slits 5 as shown in FIG. 9, the gasket substrate 4 having a thickness T is pressurized in the thickness direction so that the thickness is reduced to t as shown in FIG. 10.

In the thus configured composite gasket of the fifth embodiment, the same effects as those of the embodiments described above can be attained, and the compression of the gasket substrate 4 in the thickness direction also causes the seal material 6 to be deformed in three-dimensional directions, thereby enhancing strength.

The depth of the slits 5 is not restricted to the values of the embodiments. As indicated by chain lines in FIG. 2, a value advantageous to properties to be improved may adequately be selected and set within the range of 10 to 100% of the thickness of the seal material 1A, (1B) (21) (31).

In the embodiments described above, the slits 5 in the surface of the gasket substrate 4 have a lattice-like shape. This should be considered as an example. An arbitrary shape such as shown in FIGS. 12 to 15 may be selected.

As described above, according to the present invention, slits are formed in the surface of a sheet-like seal material in a gasket substrate, the slits elongating from the surface in the thickness direction, and a seal material composed of a substance which is different from the seal material is loaded and/or stacked into the slits and/or the surface of the seal material. Therefore, a large sheet base material may be produced, the sheet base material may be cut in an arbitrary shape or size, and the cut out material may be used. When the seal material to be combined is adequately selected and used in accordance with the sheet-like seal material from substances which are different from the materials constituting the sheet-like seal material, moreover, even in the case where a substance having arbitrary properties is selected and used as the material constituting the sheet-like seal material in the gasket substrate, the present invention can attain the effects that, while the reduction in properties is suppressed to a minimum level, in practice various problems in practical use of the gasket substrate are solved, the sealing properties are ensured, and at the same time various required properties which differ according to the use and the installation location of a gasket are improved.

We claim:

1. A composite gasket, comprising: a substrate including a sheet-like seal material having a pair of opposed outer surfaces, said sheet-like seal material comprising a laminated material selected from the group consisting of an expanded graphite sheet and a polytetrafluoroethylene sheet, in which a plurality of slits are continuously formed such that a surface of said substrate is divided into a predetermined shape and said slits extending from surface of said sheet-like seal material in a thickness direction have a substantial depth to reach the other surface of said sheet-like seal material; and a seal material comprising a substance which is different from that of said sheet-like seal material, said seal material being received inside said slits, said seal material being selected from the group consisting of expandable rubber and resin.

2. A composite gasket according to claim 1, wherein said sheet-like seal material includes local filling portions arranged on side faces of inner walls of said slits, for closing aperture portions which make lamination gaps of the sheet-like seal material communicate with the slits, by means of the seal material.

3. A composite gasket according to claim 1, wherein at least one face of said sheet-like seal material is covered with said seal material.

4. A composite gasket, comprising: a substrate including a sheet-like seal material, said substrate being configured by stacking a sheet-like seal material on at least one of the faces of a reinforcing material, said sheet-like seal material comprising a laminated material selected from the group consisting of an expanded graphite sheet and a polytetrafluoroethylene sheet, in which a plurality of slits are continuously formed, such that a surface of said substrate is divided into a predetermined shape and said slits extending from a surface of said sheet-like seal material in a thickness direction have a substantial depth to reach the other surface of said sheet-like seal material; and a seal material comprising a substance which is different from that of said sheet-like seal material, said seal material being received inside said slits, said seal material being selected from the group consisting of expandable rubber and resin.

5. A composite gasket according to claim 4, wherein said sheet-like seal material includes local filling portions arranged on side faces of inner walls of said slits, for closing aperture portions which make lamination gaps of the sheet-like seal material communicate with the slits, by means of the seal material.

6. A composite gasket according to claim 5, wherein said seal material includes at least one of organic fiber and inorganic powder.

7. A composite gasket according to claim 4, wherein at least one face of said sheet-like seal material is covered with said seal material.

8. A composite gasket according to claim 7, wherein said seal material includes at least one of organic fiber and inorganic powder.

* * * * *